(12) United States Patent
Kobayashi et al.

(10) Patent No.: US 10,491,672 B2
(45) Date of Patent: Nov. 26, 2019

(54) DATA TRANSFER DEVICE, DATA RECEIVING SYSTEM AND DATA RECEIVING METHOD

(71) Applicant: Toshiba Memory Corporation, Minato-ku (JP)

(72) Inventors: Yuta Kobayashi, Kawasaki (JP); Takahiro Yamaura, Kawasaki (JP); Kensaku Yamaguchi, Kawasaki (JP); Masataka Goto, Yokohama (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 996 days.

(21) Appl. No.: 14/658,741

(22) Filed: Mar. 16, 2015

(65) Prior Publication Data

US 2015/0271265 A1 Sep. 24, 2015

(30) Foreign Application Priority Data

Mar. 18, 2014 (JP) ................................ 2014-055567

(51) Int. Cl.
*G06F 9/312* (2018.01)
*H04L 12/66* (2006.01)
(Continued)

(52) U.S. Cl.
CPC ...... *H04L 67/1095* (2013.01); *H04L 67/2842* (2013.01); *G06F 9/30043* (2013.01)

(58) Field of Classification Search
CPC ..... H04L 69/16; H04L 69/163; G06F 3/0643; G06F 9/544
See application file for complete search history.

(56) References Cited

U.S. PATENT DOCUMENTS 7,206,864 B2 4/2007 Enko et al.
2003/0014601 A1* 1/2003 Nagayasu ........... G06F 9/30043
711/154
(Continued)

FOREIGN PATENT DOCUMENTS

JP 2005-316629 11/2005
JP 2006-155398 A 6/2006
JP 2012-242961 12/2012

OTHER PUBLICATIONS

Office Action dated Oct. 25, 2016 in Japanese Patent Application No. 2014-055567 (with English language translation).
(Continued)

*Primary Examiner* — Hee Soo Kim
*Assistant Examiner* — Ho T Shiu
(74) *Attorney, Agent, or Firm* — Oblon, McClelland, Maier & Neustadt, L.L.P.

(57) ABSTRACT

The data transfer device receives file data through a network and writes the file data to a storage device on a block basis, in which the communication processor receives a receiving instruction for the file data from an external host CPU and receives the file data via one or more packets from the network according to the receiving instruction, the receiving buffer stores data received in the communication processor therein upon receiving each packet, and the command issuance controller acquires, from the external host CPU, map information indicating a position to write the file data in a storage area of the storage device, specifies data in the receiving buffer for writing according to a data storing status of the receiving buffer, issues a write command for writing a specified data to the storage device and sends it to the storage device.

11 Claims, 10 Drawing Sheets

(51) Int. Cl.
*H04L 29/08* (2006.01)
*G06F 9/30* (2018.01)

(56) References Cited

U.S. PATENT DOCUMENTS

| | | | |
|---|---|---|---|
| 2004/0047361 A1* | 3/2004 | Fan | G06F 9/544 |
| | | | 370/411 |
| 2004/0107340 A1* | 6/2004 | Wann | H04L 9/06 |
| | | | 713/153 |
| 2005/0135415 A1* | 6/2005 | Fan | H04L 69/16 |
| | | | 370/468 |
| 2005/0149645 A1* | 7/2005 | Tsuruta | G06F 13/28 |
| | | | 710/22 |
| 2006/0203807 A1* | 9/2006 | Kouretas | H04L 41/5087 |
| | | | 370/352 |
| 2014/0012948 A1* | 1/2014 | Tanaka | G06F 3/067 |
| | | | 709/217 |

OTHER PUBLICATIONS

Takahiro Yamaura, et al., "A Proposal for Reduction in the Circuit Size of TCP/IP Offload Engine" The Institute of Electronics, information and Communication Engineers, Sep. 1, 2009, p. 116.
Shingo Tanaka, et al., "TCP/IP Offload Engine for 1 Gbps/10 Gbps Ethernet" Transactions of Symposium on multimedia, distribution, cooperation, and mobile (DICOMO2010), Information Processing Society Symposium Series, vol. 2010, No. 1, Jul. 7, 2010, pp. 324-331.

* cited by examiner

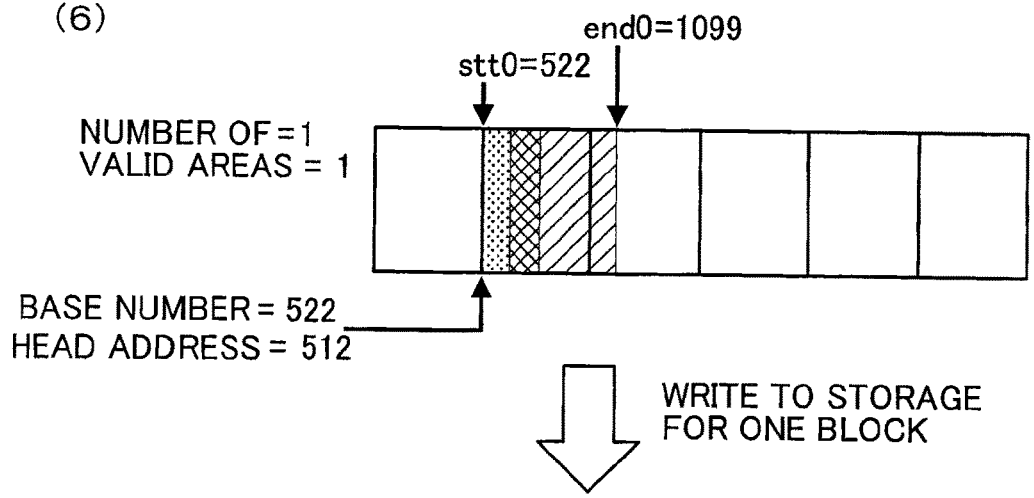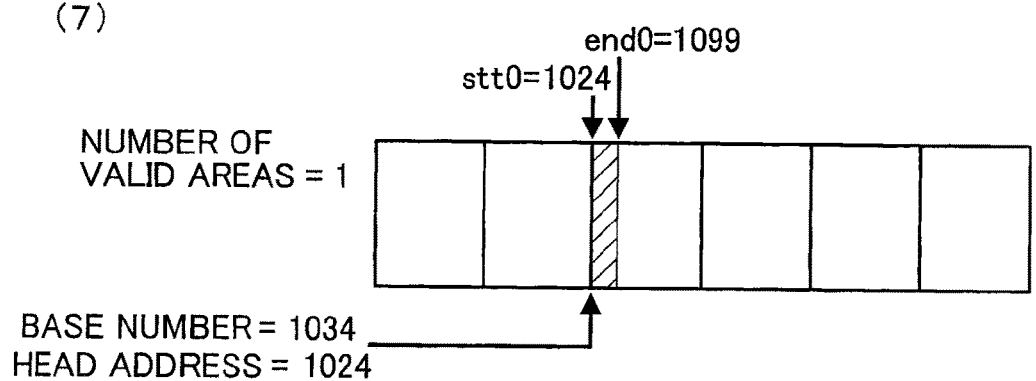
FIG. 11

DATA TRANSFER DEVICE, DATA RECEIVING SYSTEM AND DATA RECEIVING METHOD

CROSS-REFERENCE TO RELATED APPLICATIONS

This application is based upon and claims the benefit of priority from Japanese Patent Application No. 2014-055567, filed Mar. 18, 2014; the entire contents of which are incorporated herein by reference.

FIELD

Embodiments described herein relate to a data transfer device, a data receiving system and a data receiving method.

BACKGROUND

A high-speed network has spread, and performances of a communication device and a storage device loaded on each of a server device and a terminal device are improving. Accompanying that, it has become popular to download a file stored in the storage device on the server device to the storage device on the terminal device and to upload a file stored in the storage device on the terminal device to the storage device on the server device.

An HDD (Hard Disk Drive) and an SSD (Solid State Drive) are called a DAS (Direct Attached Storage) and are often used in a device for a server use. Also, a storage device utilizing a flash memory such as an SD card or an eMMC is often used in a mobile device such as a smartphone, a notebook PC, or a tablet terminal. For the storage device for the server use, there are current products that generate a write rate exceeding 3 Gbps alone because of striping processing (parallelization) of an RAID of the HDD and improvement of an SSD transfer performance in recent years. Also for the storage device for a built-in terminal, there is an SD card of an UHS-I standard that generates the write rate exceeding 480 Mbps, and specification development of a standard having the performance of a several Gbps class has been also completed.

For communication means of these server devices and terminal devices, Ethernet (R), 802.11a/b/g/n/ac or the like is used. For a communication protocol, TCP/IP, UDP/IP or the like that is widely used in the Internet or the like is used. For Ethernet, 1 Gbps is mainly used at present, and 10 Gbps has begun to be used in a data center or the like. Also, the specification development of 40 Gbps/100 Gbps Ethernet of the next generation has been completed. It is assumed that utilization of several 100 Mbps to several Gbps is to surely spread from now on in 802.11 as well.

Considering these, storage device access through a network is expected to be a band of a class of several 100 Gbps to several 10 Gbps for a server use and several 10 Gbps to several Gbps for a terminal use.

Accompanying such performance improvement of the network and the storage device, processing loads of a host CPU that controls them also increase. Conventionally, the problem has been tried to be solved by a technology called a TCP/IP offload engine (TOE, hereinafter). The TOE is an exclusive processor or an exclusive circuit that performs processing of the TCP-IP in place of the host CPU, and offloads TCP/IP processing loads from the host CPU. By using the TOE, the TCP/IP processing can be performed at a higher speed than communication protocol processing by conventional software, and the performance of the network can be improved.

The storage device and the TOE are controlled by the host CPU respectively, and data is assumed to be inputted and outputted through a main memory. Therefore, in the case of writing the data received from the network to the storage device, the data is transferred between the TOE and the storage device (SSD, HDD, SD card, eMMC, or the like) surely through the main memory.

Also, there is a case that a copy of transfer data is generated for some times on the main memory by application software that is operated on the host CPU and bridges them or delivery processing of the data between a kernel space and a user space of an OS or the like. Further, file system processing is also needed, and the data managed in a block size in implementation of a normal file system needs to be read and written in units of a sector of a fixed byte length from the storage device and shaped as a file of an arbitrary byte length. Therefore, the copy of the data is generated here, too.

As described above, for data transfer between the storage device and the TOE, since software processing of the host CPU is interposed, read/write to the main memory is needed at least once. Also, by the processing of the OS, the application and the file system, on the main memory, memory copy is generated for a plurality of times in some cases. Because of these, loads of the main memory greatly increase.

Such memory loads have been coped with conventionally by preparing the host CPU having a sufficient processing performance and a high-speed main memory, however, in consideration of the improvement of a transfer rate reaching several Gbps to 100 Gbps for a network storage device in recent years, it has become a problem in no small way.

Particularly, in order to improve performance characteristics of the main memory, upgrade of the host CPU is generally involved, and problems of costs and power consumption are particularly noticeable.

BRIEF DESCRIPTION OF THE DRAWINGS

FIG. 11 is a diagram illustrating processing following FIG. 10.

DETAILED DESCRIPTION

According to one embodiment, a data transfer device receives file data through a network and writes the file data to a storage device configured to manage data on a block basis, including a communication processor, a receiving buffer and a command issuance controller.

The communication processor receives a receiving instruction for the file data from an external host CPU, and receives the file data via one or more packets from the network according to the receiving instruction.

The receiving buffer stores data received in the communication processor therein upon receiving each packet.

The command issuance controller acquires, from the external host CPU, map information indicating a position to write the file data in a storage area of the storage device, specifies data in the receiving buffer for writing according to a data storing status indicating which data of the file data exists in the receiving buffer, issues a write command for writing a specified data to the storage device on basis of the map information and sends the write command to the storage device.

Hereinafter, with reference to drawings, embodiments of the present invention will be described.

First Embodiment

Figure 1:
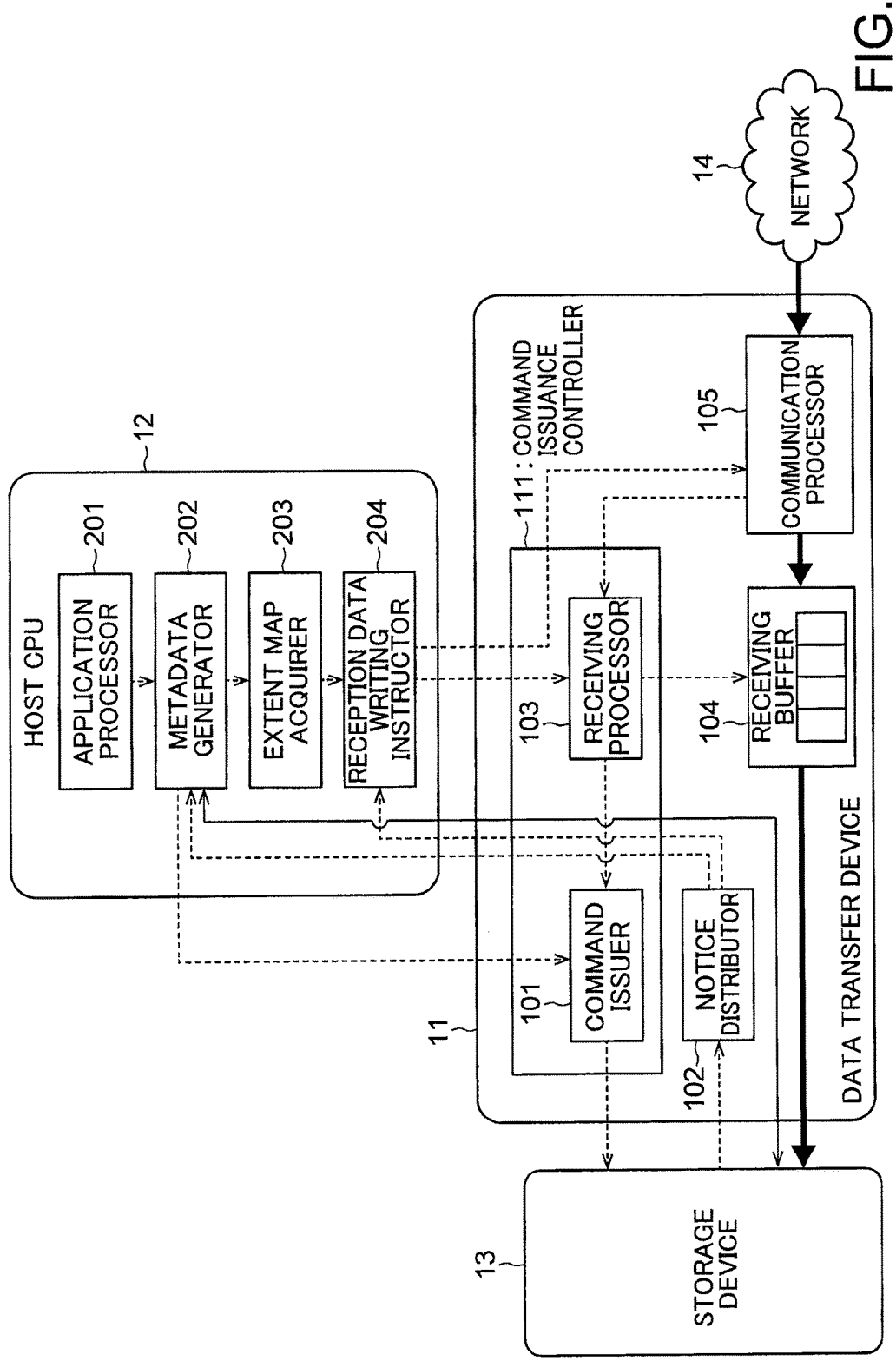
FIG. 1 is a block diagram of a data receiving system including a data transfer device according to a first embodiment.

FIG. 1 is a block diagram illustrating a schematic configuration of a data receiving system according to a first embodiment of the present invention.

The data receiving system in FIG. 1 includes a data transfer device 11, a host CPU (processor) 12, and a storage device 13. The data transfer device 11 receives file data from a network 14 and writes the received file data to the storage device 13 on the basis of information instructed from the host CPU 12. A broken line with an arrow in the figure indicates a flow of control, a narrow solid line with an arrow indicates a flow of read data or write data between the host CPU and the storage device, and a thick solid line with an arrow indicates a flow of the file data received from the network.

A specific product form of the data receiving system in FIG. 1 is assumed to be a device such as a PC, a server device, an exclusive LSI, or an FPGA (Field Programmable Gate Array). However, the product form of the present embodiment is not limited to them.

The storage device 13 is a storage device for storing data. Specific implementation of the storage device 13 is assumed to be, for instance, an SSD (Solid State Drive), an HDD (Hard Disc Drive), an SD card, an eMMC, or the like. However, the present embodiment is not limited to them.

The storage device 13 manages data in block units (i.e., on a block basis). As one example, management is performed in units called sectors. Here, they are abstracted and called blocks. Since the data handled by a user is not in block units, the storage device 13 is normally accessed by a file system. The file system maps the file data in byte units in a storage area in block units of the storage device 13. Each block is identified by an address of each block, respectively. For the file system, a known one may be utilized.

Typically, in the file system, metadata is stored in a predetermined area on the storage device. The metadata includes map information that associates the file data and a position where the file data is stored with each other, and the other various kinds of information (an identifier of a file, a time stamp or the like). When writing the file data to the storage device, first, a metadata group stored in the predetermined area is read (or the metadata group read to a main memory beforehand may be used), the metadata group is analyzed, and from an analysis result and a size of the file data, the position to write the file data is specified. When a writing position is specified, the metadata related to the file data is generated, and the generated metadata is written to the predetermined area of the storage device. At the time, in the metadata, the map information indicating which position (block) the file data is to be actually stored is included. Also, according to the map information, the file data is written to the storage device. In the present embodiment, an example of using an extent map as the map information is illustrated.

Figure 2:
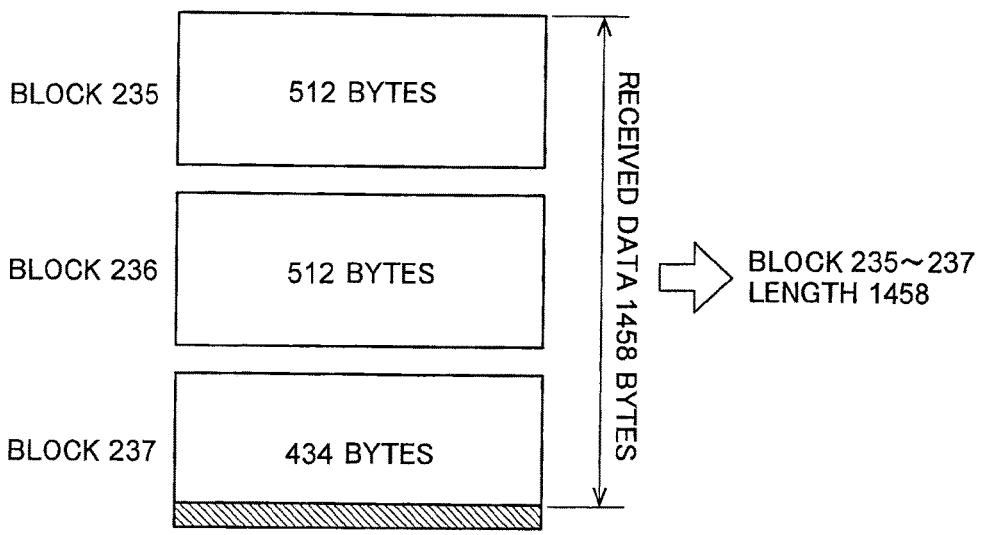
FIG. 2 is a diagram illustrating an extent map.

FIG. 2 illustrates a diagram illustrating the extent map. Here, it is defined that one block of the storage device is 512 bytes. The situation that the data of a certain portion of desired file data is stored in blocks 235-237 is illustrated. The data is started to be written from a head of the block 235, and is continuously written in all of the blocks 235 and 236 and to the 434th byte of the block 237. A length of the data to be written is 1458 bytes. In this case, the extent map is indicated as "blocks 235-237, length 1458" or the like.

Figure 3:
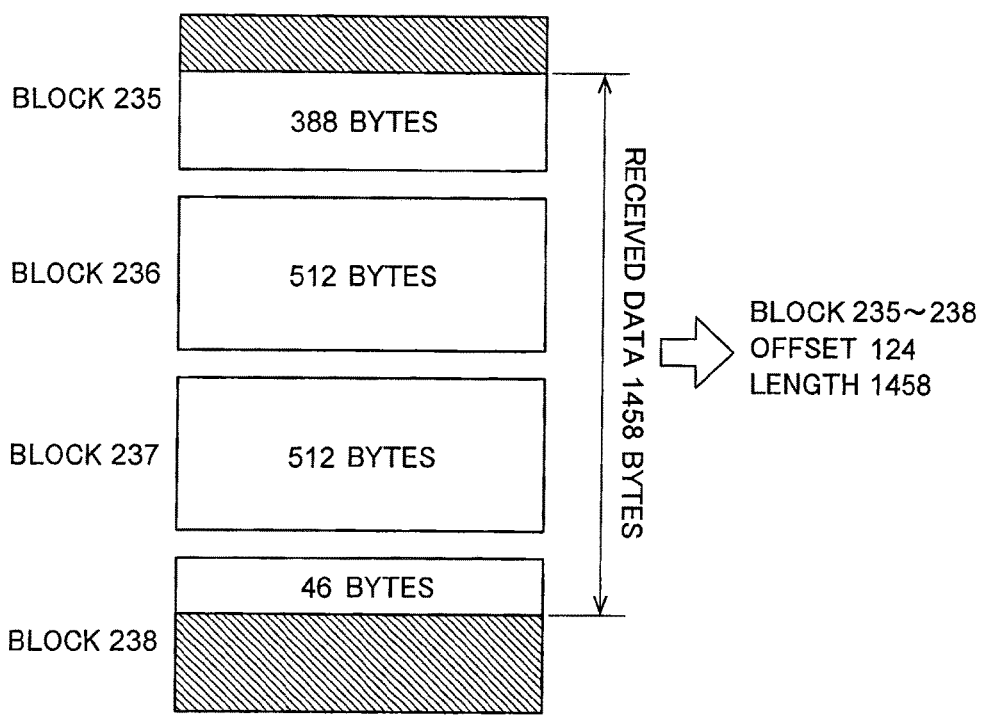
FIG. 3 is another diagram illustrating the extent map.

Here, while an example of performing write from the head of the block is illustrated, a configuration of starting the write from the middle of the block as illustrated in FIG. 3 is also possible as a modification. For instance, 124 bytes are skipped from the head of the block 235, and the write is performed continuously from the 125th byte to the 46th byte of the block 238. In this case, the extent map is indicated as "blocks 235-238, offset 124 bytes, length 1458 bytes" or the like.

In the example described here, the position where the data is stored in the storage device is indicated by the blocks and the data length (or the blocks, the data length and the offset), however, it may be indicated by a start byte position and an end byte position or the like. An expression form does not matter as long as the position where the data is stored can be specified.

Also, the example indicated here illustrates the case of storing one piece of data in a continuous block area, however, the extent map may be a form that the plurality of pieces of data are discrete respectively and stored in the continuous block areas respectively. For instance, one extent map may indicate two discrete areas of the data (1458 bytes) stored over the blocks 235 and 236 and a portion from the head of the block 237 and the data (2000 bytes) stored over the blocks 346-349 and a portion from the head of the block 350.

In such a manner, the extent map includes information that specifies the blocks where the data is stored, and information (effective data position information) that specifies the position or a range where effective data is actually stored in the blocks. By these pieces of information, where in the storage device the desired data is stored can be specified.

As the file system, not only the above extent-based file system but also a cluster (block)-based file system is possible. In the case of the cluster-based file system, an area where the data is stored is specified by a list of clusters instead of extents (the clusters may be discretely arranged). This case can be also considered similarly when it is considered as a special case of the extent (the case that the length of one extent is fixed to a cluster size). Descriptions will be given hereinafter using a term of the extent, however, it is assumed that the present embodiment includes both of them.

The network 14 is a cable communication network, a wireless communication network, or a hybrid network of these. Examples are Ethernet, a wireless LAN (Local Area Network), or the like, but any network is possible without being limited to these.

The host CPU 12 controls the entire system. The host CPU 12 includes, as main processors realized by execution of software, an application processor 201, a metadata generator 202, an extent map acquirer 203, and a reception data writing instructor 204. Below, an outline of operations of the individual parts will be described, and details of the individual parts will be described thereafter.

The application processor 201 executes a data receiving application.

The metadata generator 202 generates, for the file data received from the network 14, the metadata including the extent map indicating the writing position of the file data in the storage device 13. Also, the metadata generator 202 performs processing for writing the generated metadata to the storage device 13 through the data transfer device 11.

The extent map acquirer 203 extracts the extent map from the metadata generated in the metadata generator.

The reception data writing instructor 204 instructs reception of the file data from the network 14 to the data transfer device 11 on the basis of the extent map and the information of the file data to be received, and also instructs writing of the received file data to the storage device 13. The data to be received may be made specifiable by delivering session information to the data transfer device 11 as needed in the case that the data transfer device 11 uses a communication protocol establishing a connection with another device such as TCP/IP or the like. The information of the file data and the session information are acquired from the application processor 201 for example.

The information of the file data includes a file name (file identifier) and a file size or the like. The file name may be described by a URI or the like. The session information may include an IP address of an acquisition destination of the file data, a port number, a sequence number when a session is established, and the like (details will be described in a second embodiment).

Also, the host CPU 12 is capable of performing the other various kinds of processing. The host CPU will be described more in detail below.

The application processor 201 is an executor of some application software operated in the application processor 201 of the host CPU. The application processor 201 determines to receive the file data from the network by the execution of the application. The application processor 201 acquires information to be needed for acquiring the file data from the application software.

As a typical example, the file data stored in another device connected to the network 14 is specified as a target of acquisition, and the information of the file is acquired from the application. Specific examples of the information of the file are the file name and the file size and the like.

When the file information is acquired, the application processor 201 sends the file information (the file identifier, the file size, and the like) together with a receiving instruction for the file data to the metadata generator 202. For the processing of delivering the information of the file specified by the application processor 201 to a later-stage processor, a method of preparing a system call like a recvfile( ) function and configuring the processing within the function so as to realize the above-described operation can be considered. By using an I/F with the application by such a function, implementation to various applications is facilitated.

When the file information is received from the application processor 201, the metadata generator 202 acquires the metadata group stored in the predetermined area of the storage device 13 in order to verify a usage of a data storage area of the storage device 13. For acquisition of the metadata, a read request of the metadata is sent to the data transfer device 11, and a command issuer 101 of the data transfer device issues a read command of the metadata on the basis of the read request, and sends it to the storage device 13. The storage device 13 executes the read command of the metadata, and outputs the metadata inside the predetermined area to the metadata generator 202. Or, the metadata group may be read to the main memory by a similar method beforehand and the metadata may be acquired from the main memory.

The metadata generator 202 specifies a position (the address of one or more blocks, and a valid data position inside the block as needed) for storing the file indicated in the file information on the basis of the acquired metadata group, and generates the metadata including the map information (extent map) indicating the specified area, the file identifier, and the like. The metadata generator 202 delivers the generated metadata to the extent map acquirer 203, and also sends a write request of the generated metadata to the command issuer 101 of the data transfer device 11. The command issuer 101 of the data transfer device 11 receives the write request of the metadata, issues a write command of the metadata, and sends it to the storage device 13. The storage device 13 executes the write command of the metadata, and stores the metadata requested to be written in the predetermined area in the inside. Also, since the file identifier is also included in the metadata, read with the file identifier specified may be made possible when reading the metadata. Also, a file group stored in the storage device may be identified by reading the metadata group.

The extent map acquirer 203 extracts the extent map of the file to be a target of writing from the metadata delivered from the metadata generator 202. Also, only the extent map may be delivered from the metadata generator 202 to the extent map acquirer 203. In this case, since an extracting operation of the extent map in the extent map acquirer 203 is not needed, the extent map acquirer 203 may be omitted and the extent map may be directly outputted to the later-stage reception data writing instructor 204.

Also, the extent map may not be acquired from the metadata generator 202 but may be acquired by referring to the metadata generated by the metadata generator 202, which is cached to the memory beforehand.

Or, after the writing of the metadata to the storage device 13 is completed, the extent map acquirer 203 may request read of the metadata to the command issuer 101 of the data transfer device 11. In this case, the extent map acquirer 203 acquires the metadata read from the storage device.

The extent map acquirer 203 delivers the extent map acquired in such a manner to the reception data writing instructor 204. The reception data writing instructor 204 outputs the extent map and information instructing the reception of the file data to the data transfer device 11. Thus, the reception of the file data and the writing of the file data to the storage device are instructed to the data transfer device 11.

The data transfer device 11 performs the processing of receiving the file data from the network 14 and writing the received file data to the storage device 13 in place of the host CPU 12.

The host CPU 12 and the data transfer device 11 are connected by an arbitrary connection system. For instance, in the case that the present data receiving system is a PC, a server device or the like, they are connected by a chip set, PCI Express or the like. When the present system is SoC or the like, they may be connected by an exclusive bus or the like. On the other hand, the data transfer device 11 and the storage device 13 are connected by, for example, ATA, SAS, SCSI, SD memory card standard, or the like. The above connection examples are just examples and the present embodiment is not limited to them.

The data transfer device 11 may be configured by either of hardware and software or may be configured by both of them. A form of the implementation does not matter but a hardware-based configuration is desirable from a viewpoint of processing efficiency.

The data transfer device 11 includes a command issuance controller 111 (the command issuer 101, a receiving processor 103), a notice distributor 102, a receiving buffer 104, and a communication processor 105. As a specific implementation form of the data transfer device 11, an FPGA or an exclusive LSI is assumed.

The communication processor 105 performs arbitrary communication processing according to a kind of a communication protocol to be used. For instance, it performs the communication processing (header analysis of the TCP/IP or the like) such as TCP/IP-based protocol processing, Ethernet processing or wireless processing. The file data instructed by the host CPU 12 is divided into the plurality of pieces of data, and frames including them respectively are transmitted from the other device on the network 14. When the frame is received in a relevant session from the network 14, the communication processor 105 extracts the instructed data from the received frame.

In the case of the TCP/IP, TCP/IP packets are extracted from the received frame, and the data is extracted from the TCP/IP packets. The communication processor 105 outputs the extracted data to the receiving buffer 104, and notifies the information of the outputted data to the receiving processor 103. The communication processor 105 corresponds to the above-described TCP/IP offload engine (TOE) or the like. In the case of a protocol that establishes a connection with the other device like the TCP/IP, a frame receiving operation from the other device is an operation in a stage of data transfer after establishing the connection with the other.

The receiving buffer 104 tentatively stores the data inputted from the communication processor 105 in the inside. In the drawings, an area inside a frame indicating the receiving buffer 104 is sectioned by vertical lines for each block size of the storage device 13 and expressed. The receiving buffer 104 stores the data inputted from the communication processor 105 by an arbitrary system. There may be a form of storage in the address instructed from the receiving processor 103, a form of the storage in an input order (such as FIFO), or the like. The latter form of the storage in the input order is effective in the case that input of the file data to the receiving buffer 104 in order from the data on a head side is secured for instance. In the case of receiving an outputting instruction of the data from the storage device 13 that executes a command, the receiving buffer 104 outputs the instructed data to the storage device 13. A configuration of outputting the instructed data to the storage device 13 according to the outputting instruction from the receiving processor 103 is also possible.

The command issuance controller 111 acquires the map information indicating which position of the storage device 13 the file data is to be stored in from the external host CPU 12, and issues the write command for writing the data inside the receiving buffer 104 to the storage device 13, according to a storing status of the file data in the receiving buffer 104. The command issuance controller 111 sends the issued write command to the storage device 13. The command issuance controller 111 includes the command issuer 101 and the receiving processor 103.

The receiving processor 103 receives a notice related to the information of the extracted data every time the data is extracted from the frame in the communication processor 105. The receiving processor 103 manages a receiving status of the file data as buffer information on the basis of the extent map and the notice from the communication processor 105.

In the case that the data is stored in the receiving buffer 104 in order from the head side of the file, the receiving processor 103 can recognize to which block of the blocks indicated in the extent map the data is received on the basis of the notice from the communication processor 105. In this case, every time the data for one block is stored from the head side of the file data, for instance, the receiving processor 103 specifies the block to store that data from the extent map and sends a request to write that data to the specified block to the command issuer 101. The pieces of data for the plurality of blocks may be put together and the write request may be sent. There is a case that the data for the block size is not stored in the block at the end, and at the time, padding data is added to attain the data for the block size. The command issuer 101 receives the write request of the data from the receiving processor 103, and issues the command for writing the specified data in the specified area of the storage device 13. The command issuer 101 outputs the issued command to the storage device 13.

Also, the receiving processor 103 may recognize the data at which position in the file data is received and instruct the receiving buffer 104 to store that data in the address corresponding to a relative position inside the file data. This is possible since the individual data configuring the file data and the sequence number can be made to correspond in the case of the TCP/IP for instance. The details will be described in the second embodiment. In this case, the receiving buffer 104 stores the data in the address instructed from the receiving processor 103. The receiving processor 103 specifies the data to be written to the storage device 13 according to the writing status of the receiving buffer 104, and requests the writing of the specified data in the storage device 13 to the command issuer 101. According to the read request from the storage device 13 that executes the command, the receiving buffer 104 outputs the data. Also, the receiving processor 103 may instruct the output of the data to the receiving buffer 104 and the storage device 13 may fetch the data to the inside. When the data for the block size is stored in the receiving buffer 104 for each block of the blocks indicated in the extent map for instance, the receiving processor 103 sends the request to write that data to a relevant block to the command issuer 101. The command issuer 101 receives the write request, and issues the command for writing the specified data in the specified area of the storage device 13. The command issuer 101 outputs the issued command to the storage device 13.

The command issuer 101 receives the write request or the read request from the receiving processor 103 or the host CPU 12. For instance, the command issuer 101 receives the write request of the reception data from the receiving processor 103. Also, the write request or the read request of the metadata is received from the host CPU 12. The command issuer 101 issues the command to execute the requested processing, and outputs the issued command to the storage device 13. The command includes the information indicating the area of a writing destination or the area of a reading destination as well.

Here, the command issued by the command issuer 101 follows I/F specifications on the side of the storage device 13. There is a case that the number of writing blocks that can be specified at one time is limited or there is a limitation that discrete blocks cannot be simultaneously specified or the like. In this case, the command issuer 101 sometimes generates a plurality of command groups from one instruction from the receiving processor 103 or the host CPU 12.

With FIG. 2 described above as an example, an operation example of the receiving processor 103 and the command issuer 101 will be illustrated.

It is assumed that the data of 1458 bytes illustrated in FIG. 2 is received from the network and is stored in the receiving buffer 104. In this case, since the data larger than the block size is written in the receiving buffer 104, the write command is issued. At the time, the writing position of the storage device 13 is specified from the extent map. Here, it is assumed that the extent map is specified so as to write the data from the head of the block 235. For the block 235 and the block 236, since the data for the block size is written in the receiving buffer 104, the write command to the block 235 and the block 236 is issued. For the block 237, it is assumed that the data of the block size is not written in the receiving buffer 104 but the reception of the reception file data is completed. Therefore, the padding data for the last 78 bytes is generated, and the padding data is appended behind the data of a first half. For the data after append (the data for the block size), the write command to the block 237 is issued.

In the case of the modification in FIG. 3 described above, regarding the block 235, the offset of 124 bytes is specified. Therefore, the padding data for the first 124 bytes is prepared, and the reception data for 388 bytes is added behind the padding data. Then, for the data after the addition, the write command to the block 235 is issued. Also, in the case of allowing 124 bytes at the head of the block 235 to be the data of another application, the reception data for 388 bytes is appended behind the data of the application, and the write command is issued for the data after the append. For the blocks 236 and 237, since the data for the entire block is written in the receiving buffer, the write command to the block 236 and the block 237 is issued. For the block 238, it is assumed that the data of the block size is not written yet but the reception of the reception file data is completed. Therefore, the padding data for the last 466 bytes is prepared, and appended behind the data of the first half. For the data after the append (the data for the block size), the write command to the block 238 is issued.

In the present embodiment, while the command issuer 101 issues the command to write the reception data with the request from the receiving processor 103 as a trigger, the command issuer 101 itself may monitor the receiving buffer 104, detect that the data for the block size is written to the receiving buffer 104, and issue the command.

The notice distributor 102 receives a completion notice of the command issued by the command issuer 101 from the storage device 13, and notifies a writing completion notice or a reading completion notice to the metadata generator 202 or the reception data writing instructor 204 inside the host CPU 12 according to the notice contents.

Specifically, the notice distributor 102 returns the writing or reading completion notice to the metadata generator 202 in the case of receiving the command completion notice for the write or read of the metadata. In the case of receiving the command completion notice for the writing of the reception data, the writing completion notice is returned to the reception data writing instructor 204. In the case of receiving the writing completion notice, the reception data writing instructor 204 may notify that the reception of the file data and the writing of the file data to the storage device are completed to the application processor 201.

Here, a RAID (Redundant Array of Inexpensive Disks) function may be loaded on the storage device 13. Or, the RAID function may be provided in an I/F with the storage device 13 inside the data transfer device 11. Since both cases are not related to the essence of the present embodiment, they are omitted in descriptions.

Hereinafter, I/F processing with the storage device 13 will be described more in detail. First, it is assumed that the storage device 13 includes a typical SATA I/F such as the SSD or the HDD and has a function (DMA function) as a bus master further. In this case, the data describing the command or the like, called a descriptor, is prepared on a predetermined memory, the storage device 13 reads it, and thus the command is delivered to the storage device 13. The aforementioned command issuer 101 performs such processing.

The descriptor is normally managed in a ring buffer type, and is normally placed on the main memory (main storage device, not shown in the figure) used by the host CPU 12. The same form may be taken in the present embodiment, however, it is desirable to use a memory inside the data transfer device 11 or a memory directly connected to the data transfer device 11 in terms of not giving loads to the main memory and the host CPU 12. Also, the main memory is connected in common to a bus to which the host CPU 12 and the data transfer device 11 are connected, for instance. In this case, the storage device 13 can access the main memory through the data transfer device 11 and the bus.

Also, the address to read the data in block units from the receiving buffer 104 by DMA (Direct Memory Access) for the write to the storage device 13 is also specified beforehand inside each descriptor. In the case of reading the metadata prepared by the metadata generator 202 from the memory and writing it to the storage device 13, the address of the memory where the metadata is stored is specified inside the descriptor. Normally, since the metadata to be written hereafter is placed in the main memory, the address of the main memory is specified.

Thus, the storage device 13 can acquire the data (the reception data or the metadata) to be written to the storage device 13 from a reading address specified by the descriptor.

Also, after executing the command and writing the data (the reception data or the metadata), the storage device 13 gives the command completion notice (a response notice) to the data transfer device.

Specifically, how far the command is processed, that is, to which descriptor in a descriptor group of a ring buffer the processing is performed, is notified to the notice distributor 102 of the data transfer device by setting a DONE bit indicating processing completion of each descriptor or the like.

In the case that notice contents notified from the storage device 13 is the one of the writing of the reception data, the notice distributor 102 sends the writing completion notice to the reception data writing instructor 204 of the host CPU 12.

The host CPU 12 is notified by interruption for instance. When an interruption notice is received, the host CPU 12 successively reads the descriptor where the DONE bit is written, and recognizes that the processing is completed to the descriptor where the DONE bit is written. It is possible even in the case that the processing of the plurality of descriptors is completed at once. After reading the descriptor where the DONE bit is written, the host CPU 12 resets the DONE bit inside the descriptor.

At the time, in the case that the writing of all the reception data specified by the extent map is not ended (in the case that the writing of only a part of data is ended), the notice distributor 102 may not notify the completion to the host CPU 12. At the timing of writing completion of all the reception data specified by the extent map, the host CPU 12 may be notified only once.

In the case that the descriptor for which the processing completion is determined is the one of the writing of the metadata, the notice distributor 102 sends the writing completion notice to the metadata generator 202 of the host CPU 12. The host CPU 12 is notified by the interruption for instance. When the notice is received, the metadata generator 202 reads the descriptor where the DONE bit is written, verifies the DONE bit, and thus determines that the writing of the metadata is completed. The metadata generator 202 may shift the processing to the extent map acquirer 203 after confirming that the writing of the metadata is completed. After reading the descriptor where the DONE bit is written, the host CPU 12 resets the DONE bit inside the descriptor.

The storage device 13 cannot complete the execution of the command delivered from the command issuer 101 for some reasons such as an internal error in some cases. For instance, various reasons such as occurrence of timeout, the fact that the data (the reception data or the metadata) to be written to the storage device 13 is not stored in the memory, and the like are possible. In this case, the storage device 13 gives an error notice to the data transfer device 11. At the time, in order to allow the host CPU 12 to obtain the information of the error, the notice distributor 102 of the data transfer device 11 may relay the error notice to the host CPU 12 so that the host CPU 12 can also recognize the error information.

Figure 4:
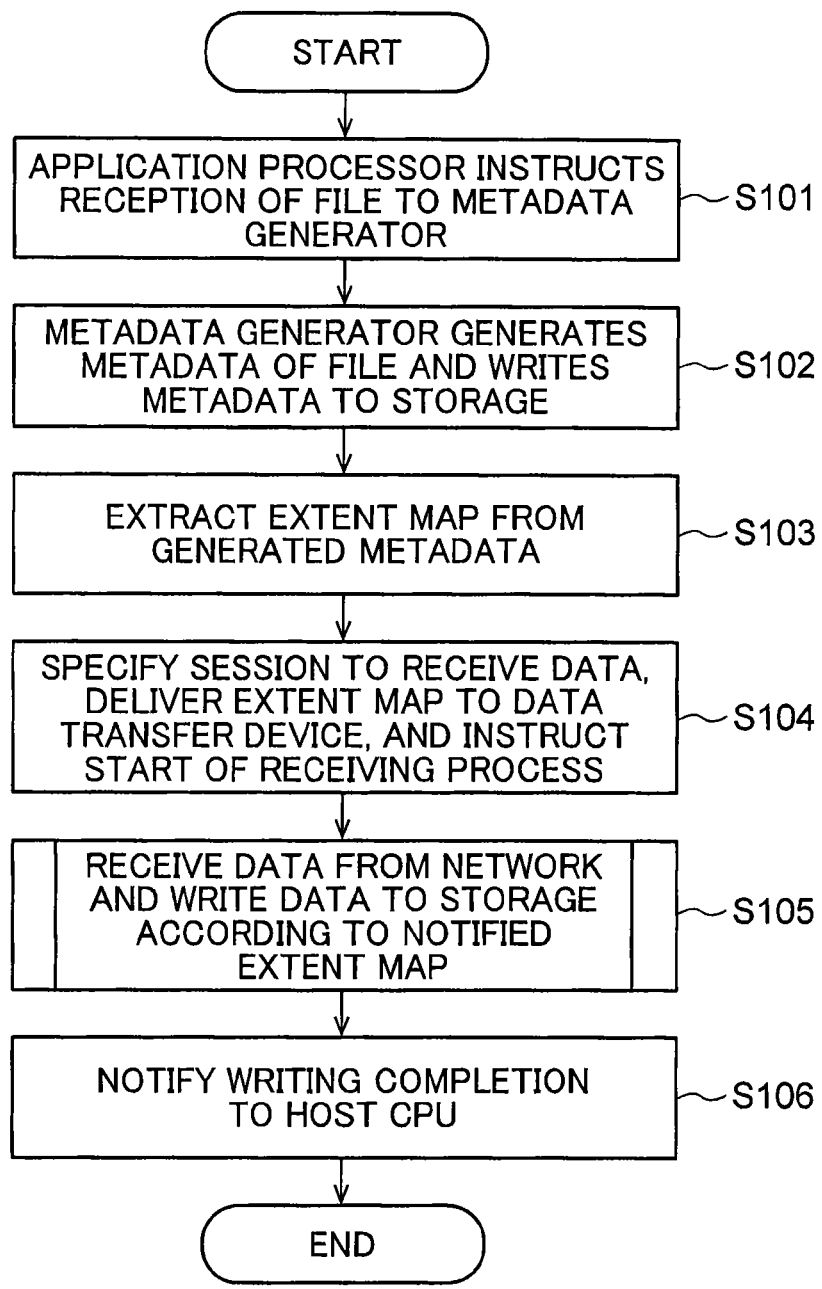
FIG. 4 is a flowchart of entire operations according to the first embodiment.

FIG. 4 illustrates a flowchart of an operation example of the data receiving system according to the present embodiment. Here, the case of establishing a session by the TCP/IP with the other device on the network 14 and performing TCP/IP packet communication is assumed.

(Step S101 in FIG. 4) The application processor 201 receives a receiving instruction for the file data by the execution of the application. The application processor 201 acquires the information of the instructed file data from the application. The application processor 201 delivers the file information to the metadata generator 202, and also instructs the reception of the file data.

(Step S102 in FIG. 4) The metadata generator 202 generates the metadata of the file instructed to be received. The metadata includes the map information (extent map) that specifies the position to write the file data in the storage device 13. The metadata generator 202 requests the data transfer device 11 to write the generated metadata to the storage device 13.

(Step S103 in FIG. 4) The extent map acquirer 203 extracts the extent map from the metadata generated by the metadata generator 202.

(Step S104 in FIG. 4) The reception data writing instructor 204 notifies the information of the session to receive the file data to the communication processor 105, and also delivers the extent map to the receiving processor 103. Thus, the start of receiving process is instructed to the data transfer device 11.

(Step S105 in FIG. 4) The data transfer device 11 communicates with the other device on the network 14 and receives the file data in the session notified from the host CPU 12.

The data transfer device 11 writes the file data received from the network 14 to the receiving buffer 104. According to the extent map notified from the host CPU 12 and a status of the receiving buffer 104, the data transfer device 11 issues the write command for writing the data inside the receiving buffer 104 to the block of the storage device 13, and outputs it to the storage device 13.

(Step S106 in FIG. 4) When the writing of the file data to the storage device 13 is all completed, the notice distributor 102 notifies the writing completion of the file data to the reception data writing instructor 204 of the host CPU 12.

Figure 5:
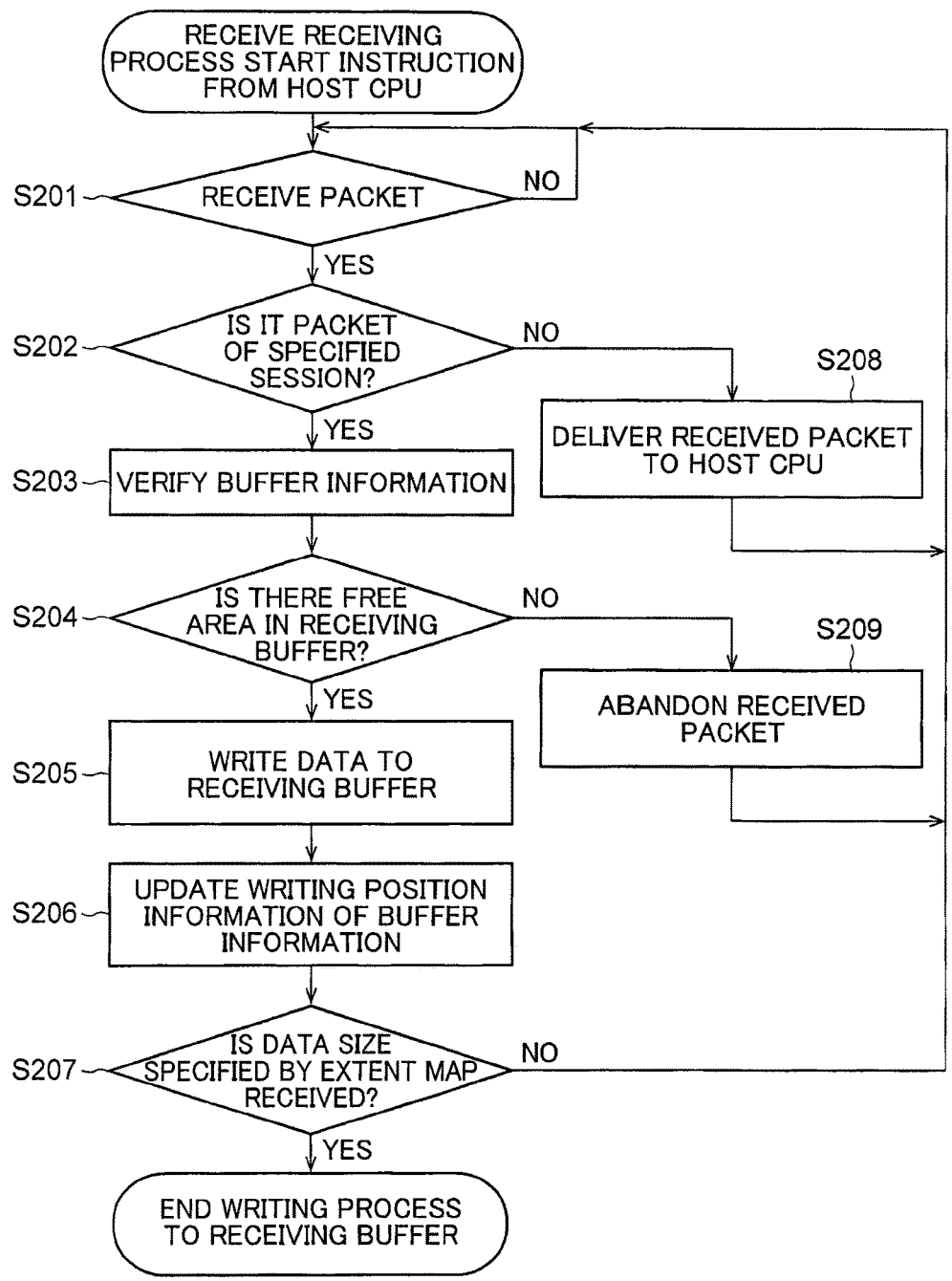
FIG. 5 is a flowchart of data receiving process according to the first embodiment.

FIG. 5 illustrates a detailed flowchart of the processing of writing the reception data from the network 14 to the receiving buffer 104 among the processing performed by the data transfer device 11 in step S105.

(Step S201 in FIG. 5) The communication processor 105 successively receives packets from the network 14. The packet includes a part of the file data. For the received packet, the communication processor 105 checks whether or not it is the packet of the session specified from the host CPU 12 (S202). Whether or not it is of the specified session is determined by header information (an IP address, a port number, or the like) of the packet for instance. When it is not the packet of the specified session, the received packet is delivered to the host CPU 12 (S208) and the processing returns to step S201.

(Step S203 in FIG. 5) When the received packet is the packet of the specified session, the buffer information is verified. The buffer information may be held inside the receiving buffer 104, may be held in an internal buffer of the receiving processor 103 or the communication processor 105, or may be held in the main memory (not shown in the figure). It is assumed here that the buffer information includes writing position information indicating the address where the reception data is written inside the receiving buffer 104, and reading position information indicating the address where the reception data is read inside the receiving buffer 104. Here, correspondence between the address inside the receiving buffer 104 and the sequence number of the packet is attained beforehand and the address to store the data inside the packet may be made specifiable from the sequence number.

(Step S204 in FIG. 5) Whether or not there is a available area to write the data inside the received packet in the receiving buffer 104 is determined from the buffer information, and when there is no available area, the packet is discarded (S209) and the processing returns to step S201. In this case, the other device is prompted to resend the packet, and at the point of time when the available area is generated, the processing advances to the next step.

(Step S205 in FIG. 5) When it is determined that there is the available area inside the receiving buffer 104, the data inside the packet is written in the receiving buffer 104. Then, the writing position information of the buffer information is updated (S206).

(S207 in FIG. 5) Whether or not the reception of all the file data instructed to be received from the host CPU 12 is completed is determined. That is, whether or not the reception of the data for the size specified by the extent map is completed is determined. When the reception of the data for the specified size is not completed yet, the processing returns to step S201. In the case that the reception of the data for the specified size is completed, this processing is ended.

Figure 6:
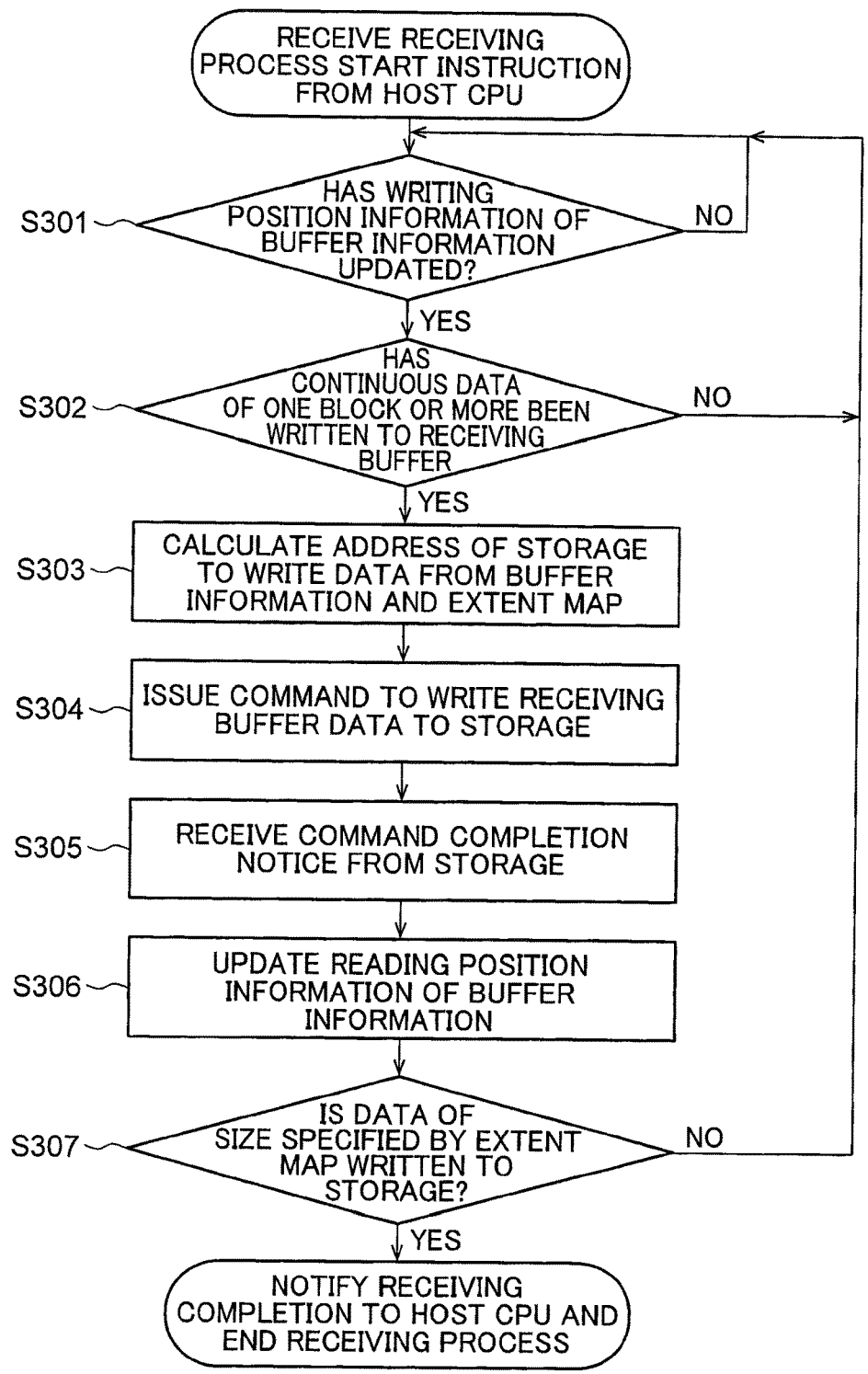
FIG. 6 is a flowchart of data writing process according to the first embodiment.

FIG. 6 illustrates a detailed flowchart of the processing of reading the data to the storage device 13 from the receiving buffer 104 and writing it among the processing performed by the data transfer device 11 in step S105.

(Step S301 in FIG. 6) The receiving processor 103 determines whether or not the writing position information of the buffer information is updated. When the writing position information of the buffer information is updated, whether or not the continuous data of the block size or larger, that is the data of the block not read yet, is written in the receiving buffer 104 is determined (S302). When the continuous data not read yet does not reach the size of one block, the processing returns to step S301.

(Step S303 in FIG. 6) When the continuous data not read yet becomes the size of one block or an integral multiple thereof, the address of the block of a storage to write the data is calculated from the buffer information and the extent map. The address indicates single or the plurality of blocks. However, there is the case of the write to the middle of the block in the block at the end of writing the file, and in that case, step S303 is executed even when it is smaller than the block size.

(Step S304 in FIG. 6) The command is issued so as to write the data for one block or the integral multiple thereof in the receiving buffer 104 to the storage. The case of issuing one command for the data for all the blocks, or the case of dividing the command for each data for the block size are possible. The issued command is outputted to the storage device 13. Also, in the case of the block at the end, the padding data for a difference between the size of the reception data to be written in the block at the end and the block size may be appended behind the reception data and outputted. The storage device 13 executes the command, reads the data from the specified address inside the receiving buffer 104, and stores the read data in the block instructed by the command.

(Step S306 in FIG. 6) The receiving processor 103 updates the reading position information of the buffer information.

(Step S307 in FIG. 6) In the case that the data for the size specified by the extent map is written to the storage device, this processing is ended, and in the case that the write is not completed yet, the processing returns to step S301.

As described above, according to the first embodiment, in the case of receiving request of the file data reception from the application, the file data can be received from the network 14 and written to the storage device 13 without giving loads of data transfer processing to the host CPU 12 and the main memory (not shown in the figure).

That is, in a known configuration, the host CPU generates the metadata and acquires the extent map by executing control software of a device driver, a file system software, or the like on the basis of the write request of the file data of the application, and writes the data delivered from the application accordingly to the storage device. To the contrary, in the present embodiment, only complicated processing such as the generation of the metadata is performed in the host CPU (software), and the other processing, that is, the writing process to the storage device of the file data received from the network 14, is performed in the data transfer device (for instance, an exclusive hardware device). Therefore, the processing efficiency can be improved, and a speed of data transfer can be accelerated.

Also, since the host CPU 12, or a chip set, a memory, a motherboard, or the like accompanying it can be downgraded, costs of the device can be lowered. Or, since large part of the processing of the data transfer can be executed not by software processing of the host CPU 12 but by hardware processing of the data transfer device 11, power consumption of the device can be reduced.

Second Embodiment

For the present embodiment, the process in consideration of a protocol guaranteeing an order of arrival of the data by the sequence number like the TCP/IP is added to the first embodiment. Hereinafter, the present embodiment will be described in detail.

Figure 7:
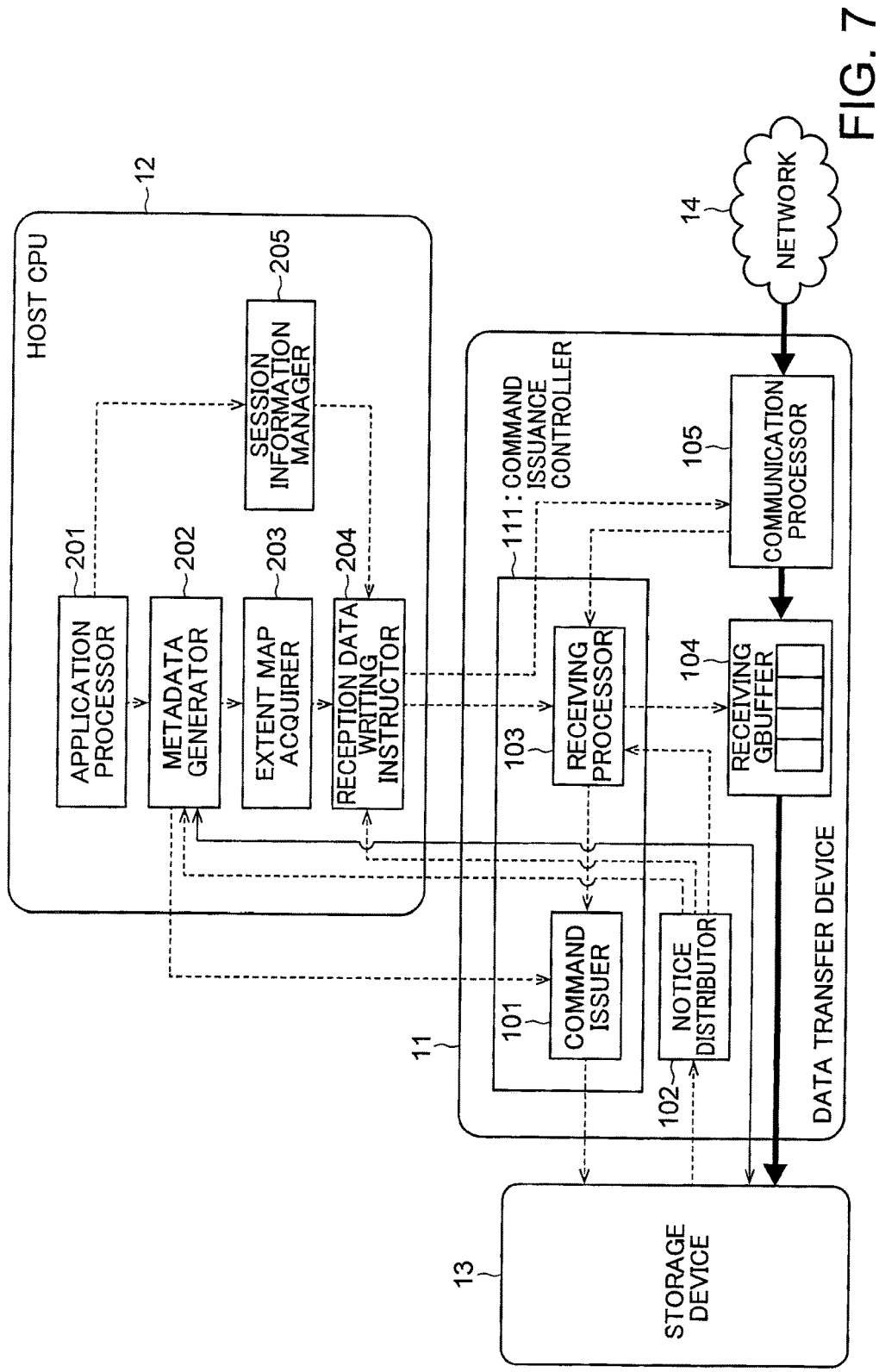
FIG. 7 is a block diagram of a data receiving system including a data transfer device according to a second embodiment.

FIG. 7 is a block diagram illustrating a schematic configuration of the data receiving system including the data transfer device according to the second embodiment of the present invention. The same symbols are imparted to elements of the same name as the elements illustrated in FIG. 1, and overlapping descriptions are omitted except for extended or changed processing.

In FIG. 7, a session information manager 205 is added to the host CPU 12 in FIG. 1. The session information manager 205 manages the session information of the TCP/IP to be used when receiving the data.

When acquiring the file information by the processing of the application software, the application processor 201 also acquires the session information (the IP address, the port number, the sequence number, or the like) of the TCP/IP to be used when receiving the file from the session information manager 205.

The application processor 201 notifies the acquired session information to the reception data writing instructor 204. In a typical example, the application processor 201 acquires the file information such as the file name, the file size, and the like from the other device on the network 14, and diverts the session used at the time as it is. In this case, a session identifier of the session may be notified to the reception data writing instructor 204 so as to make access to the session information possible.

The reception data writing instructor 204 delivers the session information notified from the application processor 201 to the data transfer device 11 together with the extent map notified from the extent map acquirer 203.

The data transfer device 11 executes the receiving process of the file data while considering the arrival order of the data, on the basis of the extent map and the session information notified from the host CPU 12.

Hereinafter, using FIG. 8, the receiving process of the data transfer device according to the present embodiment will be described in detail.

Figure 8:
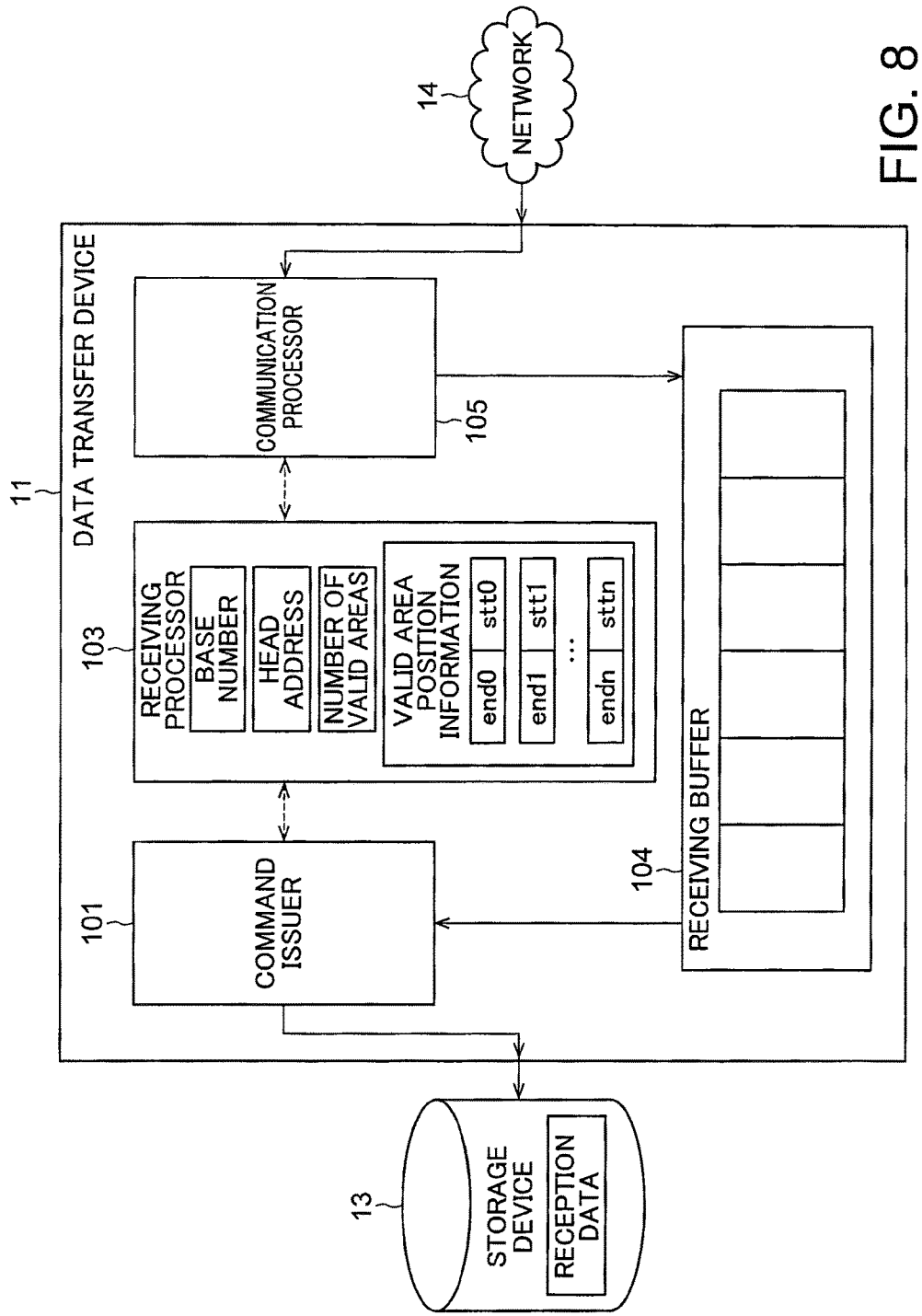
FIG. 8 is a diagram for illustrating operations of receiving process and writing process according to the second embodiment.

In FIG. 8, the information (buffer information) to be used in the receiving processor 103 is described inside a block indicating the receiving processor 103. In FIG. 8, notations of the host CPU 12 and the notice distributor 102 are omitted.

In the present embodiment, the receiving buffer 104 is used as the ring buffer. The receiving processor 103 manages a state of the receiving buffer 104 as the buffer information. The buffer information managed by the receiving processor 103 includes, as illustrated in FIG. 8, a "head address" (for instance, the head address is 0) indicating the head of the ring buffer, a base number, valid area position information, and the number of valid areas.

The base number indicates the sequence number corresponding to the "head address" in the session used in the receiving process. The base number is equivalent to the sequence number of the first packet by which the file data is transmitted from the other device, and is specifiable from the sequence number of the packet when the session is established. The "head address" and the base number described above are included in the session information notified from the reception data writing instructor 204. The session information manager 205 or the application processor 201 specifies an arbitrary value or a predetermined value as the "head address" as an example. The specification of the "head address" may be omitted and the receiving processor 103 may decide a predetermined value as the "head address". Also, in the present embodiment, it is defined that one sequence number corresponds to one byte, however, the present embodiment is not limited to it.

The valid area position information is information that specifies a range of an area (valid area) where the data is continuously written in the receiving buffer 104. One piece of the valid area position information includes two pieces of information that are "stt" indicating the sequence number corresponding to a start address where the data is written and "end" indicating the sequence number corresponding to an end address.

While an example of indicating the valid area position information using the sequence number is illustrated here, it is also possible to indicate it by a different form. For instance, the valid area position information may be indicated using the address of the receiving buffer 104. That is, since the address inside the receiving buffer 104 and the sequence number are made to correspond on a one-to-one basis from the correspondence between the base number and the "head address", the valid area position information can be expressed using either of the address and the sequence number.

The number of the valid areas indicates the number of the valid areas present in the receiving buffer 104.

Figure 9:
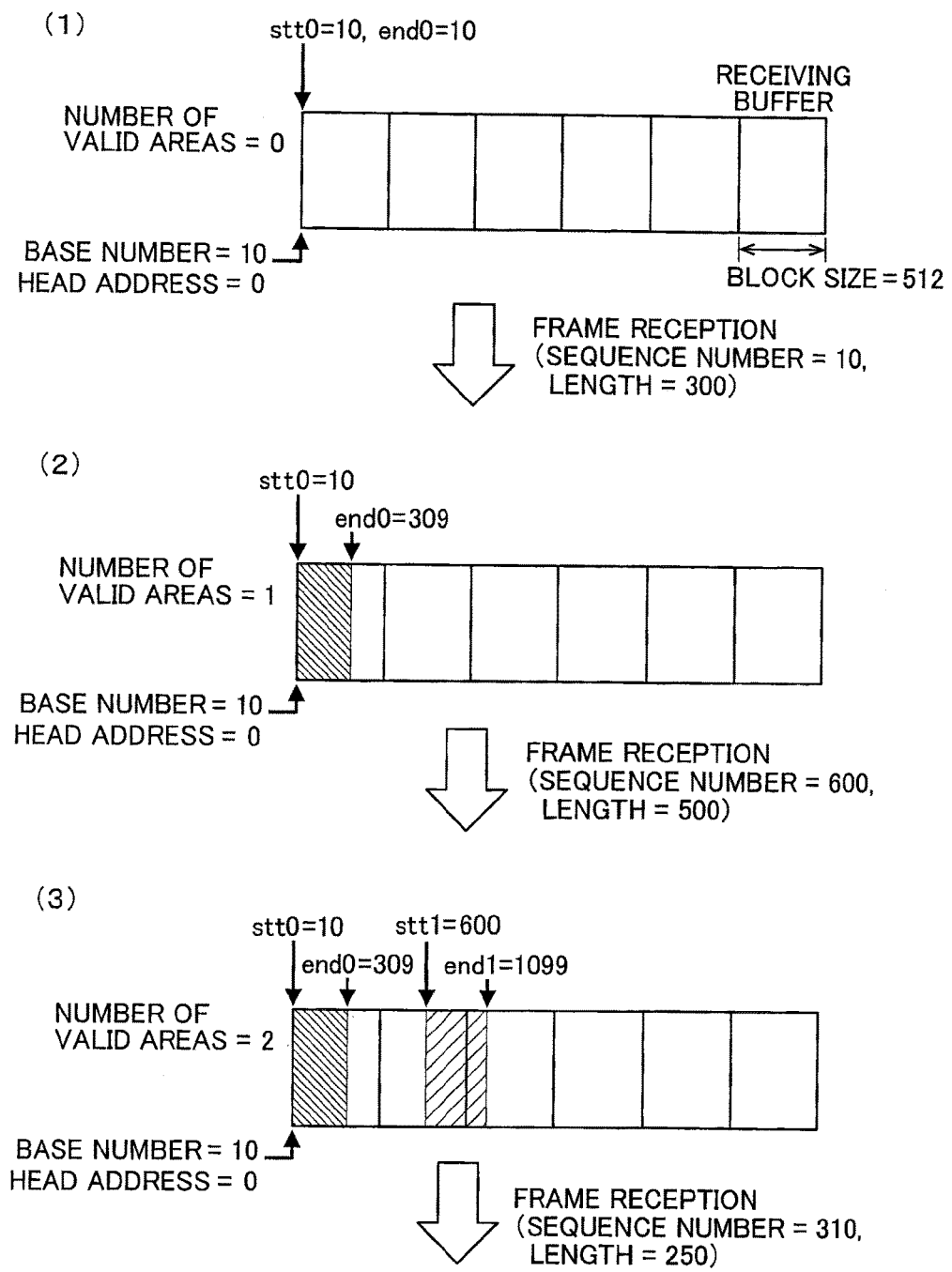
FIG. 9 is a diagram illustrating a specific example of the receiving process and the writing process according to the second embodiment.
Figure 10:
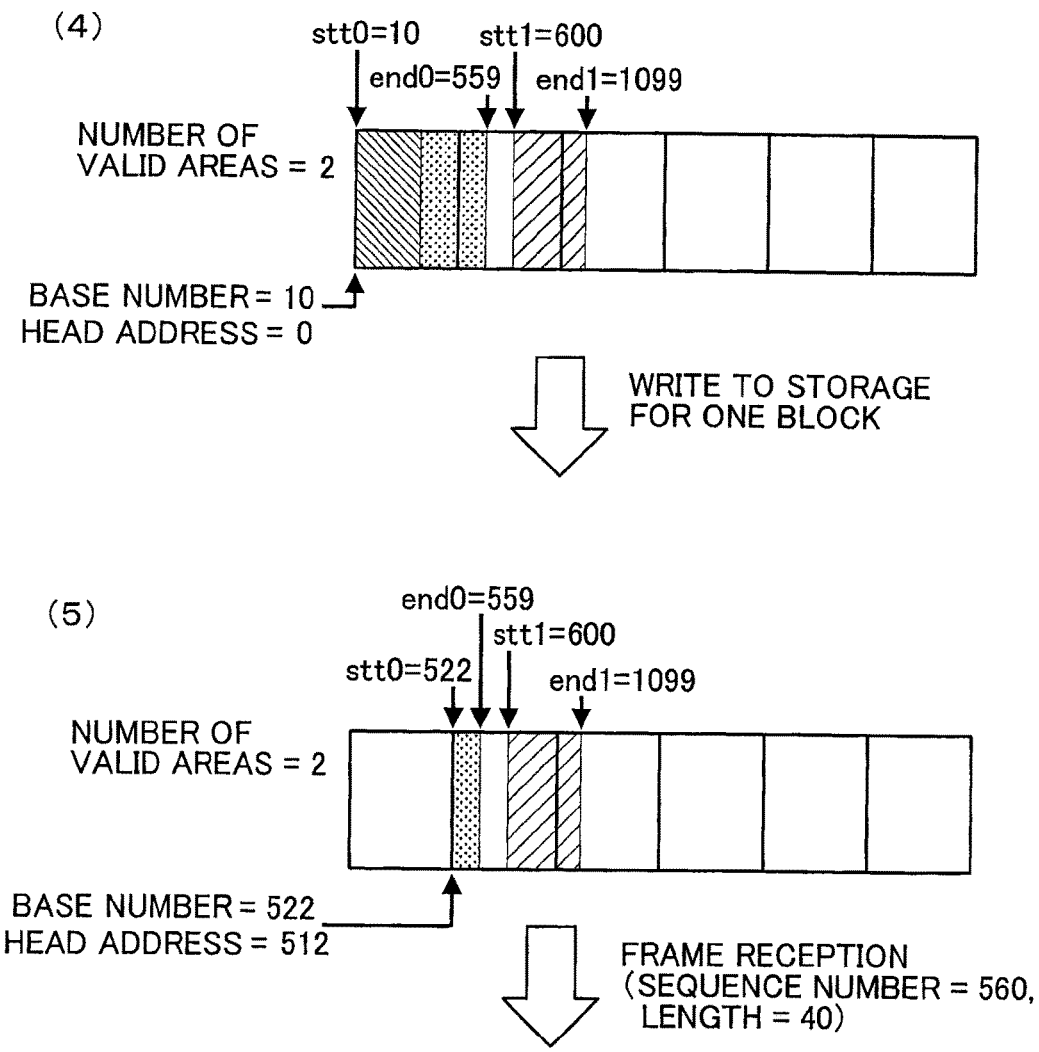
FIG. 10 is a diagram illustrating processing following FIG. 9.

FIG. 9, FIG. 10 and FIG. 11 illustrate the buffer information and the state of the receiving buffer 104 in the receiving process in the present embodiment in a time sequential manner.

FIG. 9(1) illustrates the buffer information at the start of the reception and the state of the receiving buffer 104. In the example in FIG. 9, 0 is set for the "head address" and 10 is set for the base number. That is, to the address 0 of the receiving buffer 104, the data of the sequence number 10 of a TCP/IP frame sent from the other device is to be written. At the present point of time, since the data is not written yet in the receiving buffer 104, 0 is set for the number of the valid areas. The number 0 of the valid areas indicates the state that no data is written in the buffer. Also, in the figure, the area inside a frame indicating the receiving buffer 104 is sectioned by vertical lines for each block size.

In the state of FIG. 9(1), when the frame including the data of the sequence number 10 and the length being 300 bytes is received, the receiving processor 103 verifies the buffer information. Since 0 is set for the number of the valid areas, the receiving buffer 104 is empty. Also, since 10 is set for the base number of the receiving buffer 104, it is determined that the data inside the received frame is writable to the receiving buffer 104. Therefore, the data is written from the address 0 corresponding to the sequence number 10 to an address 309. At the time, the number of the valid areas is set at 1.

Also, "stt0" of a valid area 0 (the valid areas validly existing at present are identified by consecutive numbers of 0, 1, 2, 3, . . . . Here, since it is the first valid area, it is identified by 0) is set at the sequence number 10 corresponding to the start address (that coincides with the "head address") of the valid area 0, and "end0" is set at a sequence number 309 corresponding to the end address of the valid area 0 (FIG. 9(2)). Thus, the data transfer device 11 can recognize that the data of the sequence numbers 10 to 309 is written in the receiving buffer 104 in the following receiving process.

Next, in the state of FIG. 9(2), the frame including the data of a sequence number 600 and the length being 500 bytes is received. The receiving processor 103 verifies the buffer information, and since the number of the valid areas is set at 1, recognizes that the data is written in the valid area 0. In the valid area 0, the data of the sequence numbers 10 to 309 is received. Since the frame received this time is not continuous to the sequence number of the data stored in the valid area 0, in the receiving buffer 104, an area of addresses 590 to 1089 corresponding to sequence numbers 600 to 1099 is newly set as a valid area 1, and the reception data is written here. At the time, the number of the valid areas is set at 2, "stt1" of the valid area 1 is set at the sequence number 600 corresponding to the start address of the valid area 1, and "end1" is set at the sequence number 1099 corresponding to the end address of the valid area 1 (FIG. 9(3)).

Next, in the state of FIG. 9(3), the frame including the data of a sequence number 310 and the length being 250 bytes is received. The receiving processor 103 verifies the buffer information, and since the number of the valid areas is set at 2, recognizes that the data is written in the valid area 0 and the valid area 1. When "end0" of the valid area 0 is confirmed, the frame received this time is continuous to the sequence number of the data stored in the valid area 0. Then, in a form of extending the valid area 0, in the receiving buffer 104, the reception data is written in addresses 300 to 549 corresponding to sequence numbers 310 to 559. At the time, since the valid area 0 is extended, only "end0" of the valid area 0 is changed to the sequence number 559 (FIG. 10(4)).

Here, since the data corresponding to one block of the storage device is present in the receiving buffer 104, the receiving processor 103 notifies the buffer information to the command issuer 101. The command issuer 101 calculates the reading address of the receiving buffer 104 and a writing address of the storage device 13 from the buffer information and the extent map, and issues the command. The reading address of the receiving buffer 104 is for one block from the "head address" in the buffer information. The writing address of the storage device is specified from the extent map notified from the reception data writing instructor 204. By the execution of the issued command by the storage device 13, the data is read from the receiving buffer 104 and written to the storage device 13.

When the write to the storage device 13 is completed, the buffer information in the receiving processor 103 is updated in the form of excluding the information for the data for which the write to the storage device 13 is completed.

Specifically, as in FIG. 10(5), the base number is updated to the smallest sequence number 522 for which the write to the storage device 13 is not completed, and the "head address" is updated to an address 512 of the receiving buffer 104, that corresponds to the base number. Also, since the write to the storage device 13 is performed for the first 512 bytes of the valid area 0, "stt0" of the valid area 0 is updated to a base number 522. By updating the buffer information in such a manner, a data area for which the write to the storage device 13 is completed can be released from the receiving buffer 104.

That is, the data area can be used as an available area thereafter.

Next, in the state of FIG. 10(5), the frame including the data of a sequence number 560 and the length being 40 bytes is received. The receiving processor 103 verifies the buffer information. Since the number of the valid areas is set at 2, it is recognized that the data is written in the valid area 0 and the valid area 1. It is determined that the frame received this time is writable between the end address 559 of the valid area 0 and the start address 600 of the valid area 1. Then, in a form of connecting the valid area 0 and the valid area 1, the reception data is written in addresses 550 to 589 corresponding to sequence numbers 560 to 599. At the time, the valid area 1 is integrated in the valid area 0, and the number of the valid areas is updated to 1. Also, "end0" of the valid area 0 is updated to 1099 set for "end1" of the valid area 1 (FIG. 11(6)).

Here, since the data corresponding to one block of the storage device is present in the receiving buffer 104 again, the command issuer 101 issues a data write command to the storage device, and updates the buffer information in the form of excluding the information for the data for which the write is completed (FIG. 11(7)).

Also in the following processing, by executing the receiving process while updating the buffer information similarly to the above, the data for the size of the specified extent map can be written to the storage device 13.

In the case that the data for the sequence numbers (a sequence number group for the data size starting from the start sequence number described in the frame) of the received frame does not fit in the receiving buffer 104, that is, in the case that the available area for writing all the data in the received frame is not present in the receiving buffer 104, the received frame may be discarded. Also, an upper limit is set for the number of the valid areas, and the received frame can be discarded in the case that the number of the valid areas exceeds the upper limit.

The communication processor 105 may specify a data range already received continuously from the head of the file data in the receiving buffer 104, and may transmit information that identifies the specified already received data range through the network 14 to the other device. As the information that identifies the specified already received data range, information indicating the smallest sequence number among the sequence numbers corresponding to unreceived data following the specified range may be transmitted. Specifically, the communication processor 105 may calculate an ACK number (the sequence number for which the reception can be performed without a break from the head of the file data+1) using "end0" of the valid area 0 when the receiving processor 103 writes the data in the receiving buffer 104, and return an ACK response to the other device. Also, the communication processor 105 may calculate the sequence number for which the reception is already performed on the basis of the present valid area, and notify SACK (Selective-ACK) to the other device.

As described above, according to the second embodiment, even in the case of using the protocol of guaranteeing the arrival order by the sequence number, the data received from the network 14 may be rearranged in a correct data order and written onto the storage device 13 without giving the loads of the data transfer processing to the host CPU 12 and the main memory (not shown in the figure). Therefore, processing efficiency can be improved and the speed of the data transfer can be improved.

Also, since the host CPU 12, or the chip set, the memory, the motherboard, or the like accompanying it can be downgraded, the costs of the device can be lowered.

Or, since large part of the processing of the data transfer can be executed not by the software processing of the host CPU 12 but by the hardware processing of the data transfer device 11, the power consumption of the device can be reduced.

The data transfer device as described above may also be realized using a general-purpose computer device as basic hardware. That is, each block in the data transfer device can be realized by causing a processor mounted in the above general-purpose computer device to execute a program. In this case, the data transfer device may be realized by installing the above described program in the computer device beforehand or may be realized by storing the program in a storage medium such as a CD-ROM or distributing the above described program over a network and installing this program in the computer device as appropriate. Furthermore, the storage may also be realized using a memory device or hard disk incorporated in or externally added to the above described computer device or a storage medium such as CD-R, CD-RW, DVD-RAM, DVD-R as appropriate.

Furthermore, the data transfer device may include a CPU (Central Processing Unit), a ROM (Read Only Memory) and a RAM as one example of circuitry. In this case, each unit or each element in the data transfer device can be controlled by a CPU's reading out into a RAM and executing a program which is stored in a storage or ROM.

Also, the above-stated hardware configuration is one example and the data transfer device according to an embodiment can be realized by an integrated circuit such as a LSI (Large Scale Integration) or an IC (Integrated Circuit) chip set as one example of circuitry. Each function block in the data transfer device can be realized by a processor, individually, or a part or all of the function blocks can be integrated and realized by one processor. A means for the integrating the part or all of the function blocks is not limited to the LSI and may be dedicated circuitry or a general-purpose processor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A data transfer system comprising:
a host CPU configured to specify an identifier of target file data; and
a data transfer device which receives the target file data having the identifier from a communication device in a network and writes the target file data into a storage device, the storage device being configured to manage data on a block basis and arranged outside the host CPU,
wherein the host CPU
reads out map information from a predetermined area of the storage device, the map information including one or more metadata each indicating correspondence between an identifier of file data and an area which the file data is stored in the storage device, specifies an available area to write the target file data in the storage device based on the map information and a size of the target file data, the available area including a plurality of blocks in the storage device, generates target metadata indicating correspondence between the specified available area and the identifier of the target file data, and adds the target metadata into the map information stored in the predetermined area of the storage device, wherein the data transfer device includes a receiving buffer configured to store data therein;

a communication processor configured to receive a reception instruction of the target file data from the host CPU, the reception instruction including the identifier of the target file data and session information indicating a session for reception of the target file data, establish the session according to the session information with the communication device, receive a plurality of packets from the network, check whether a session of each of the received packets coincides with the established session, and determine an address for writing data of each of the received packets in the receiving buffer based on a relative position of the data within the target file data, the data of each of the received packets being part of the target file data, if the session of each of the received packets coincides with the established session, and write the data of each of the received packets at the determined address in the receiving buffer; and a command issuance controller to receive the target metadata from the host CPU, monitor the receiving buffer to determine whether a block size of continuous data is stored in the receiving buffer at addresses corresponding to the block size in order from a head of the target file data, issue a write command for writing the block size of continuous data at a corresponding block of the plurality of blocks in the storage device if the block size of continuous data is stored in the receiving buffer, and send the write command to the storage device which executes the write command, and wherein the receiving buffer outputs the continuous data of the block size to the storage device to write the block size of continuous data at the corresponding block in the storage device.

2. The system according to claim 1, wherein
the command issuance controller determines whether an entirety of the data corresponding to each of the blocks is stored in the receiving buffer, and issues the write command for writing the entirety of the data corresponding to each of the blocks when the entirety of the data corresponding to each of the blocks is stored in the receiving buffer.

3. The system according to claim 2, wherein
the packets received via the session indicated in the session information include sequence numbers and parts of the target file data, and
the command issuance controller
stores the data of each of the received packets at an address corresponding to a sequence number of each of the received packets in the receiving buffer,
manages correspondence between the blocks and the sequence numbers, and
determines whether the entirety of the data corresponding to each of the blocks is stored in the receiving buffer based whether all of the packets including the sequence numbers corresponding to each of the block are received.

4. The system according to claim 1, wherein the command issuance controller specifies a range of data having been stored continuously from the head of the target file data in the receiving buffer, and transmits first information indicating the specified range to the communication device in the network.

5. The system according to claim 4, wherein the command issuance controller transmits information indicating a smallest sequence number of data which follows the specified range and which is not yet stored in the receiving buffer.

6. The system according to claim 1, wherein the session indicated in the session information is a session of TCP/IP.

7. The system according to claim 1, wherein the transfer device further comprises a notifier to receive a completion notice of execution of the write command from the storage device each time the execution of the write command is completed, and in the case that writing of the target file data is completed, notify a write completion response to the host CPU.

8. The system according to claim 1, wherein the command issuance controller receives a write request of the target metadata from the host CPU, generates a write command for writing the target metadata into the predetermined area, and sends the write command of the target metadata to the storage device.

9. A data receiving method using a host CPU configured to specify an identifier of target file data: and a data transfer device which receives the target file data having the identifier from a communication device in a network and writes the target file data into a storage device, the storage device being configured to manage data on a block basis and arranged outside the host CPU, the method comprising:

reading out, by the host CPU, map information from a predetermined area of the storage device, the map information including one or more metadata each indicating correspondence between an identifier of file data and an area which the file data is stored in the storage device;

specifying, by the host CPU, an available area to write the target file data in the storage device based on the map information and a size of the target file data, the available area including a plurality of blocks in the storage device;

generating, by the host CPU, target metadata indicating correspondence between the specified available area and the identifier of the target file data;

adding, by the host CPU, the target metadata into the map information stored in the predetermined area of the storage device;

receiving, by the data transfer device, a reception instruction of the target file data from the host CPU, the reception instruction including the identifier of the target file data and session information indicating a session for reception of the target file data;

establishing, by the data transfer device, the session according to the session information with the communication device;

receiving, by the data transfer device, a plurality of packets from the network;

checking, by the data transfer device, whether a session of each of the received packets coincides with the session indicated in the session information;

receiving, by the data transfer device, the target metadata from the host CPU;

determining, by the data transfer device, an address for write of data of each of the received packets in a receiving buffer based on a relative position of the data within the target file data if the session of each of the received packets coincides with the session indicated in the session information, the data of each of the received packets being part of the target file data, and writing the data of each of the received packets at the determined address in the receiving buffer;

monitoring, by the data transfer device, the receiving buffer based on the target metadata to determine whether a block size of continuous data is stored in the receiving buffer at addresses corresponding to the block size in order from a head of the target file data;

issuing, by the data transfer device, a write command for writing the block size of continuous data at a corresponding block of the plurality of blocks in the storage device if the block size of continuous data is stored in the receiving buffer;

sending, by the data transfer device, the write command to the storage device which executes the write command; and outputting the block size of continuous data from the receiving buffer to the storage device to write the block size of continuous data at the corresponding block in the storage device.

10. The system according to claim 1, wherein the packets received via the established session include parts of the target file data.

11. The system according to claim 1, wherein the packets received via the established session include sequence numbers wherein the sequence numbers are associated with addresses of the receiving buffer, and the command issuance controller determines the address for writing data of each of the received packets based on the sequence number of each of the received packets.

* * * * *